United States Patent
Kim et al.

(10) Patent No.: US 10,169,469 B2
(45) Date of Patent: Jan. 1, 2019

(54) SYSTEM AND METHOD FOR SEARCHING USING ORTHOGONAL CODES

(71) Applicant: ELECTRONICS AND TELECOMMUNICATIONS RESEARCH INSTITUTE, Daejeon (KR)

(72) Inventors: Jung-Im Kim, Daejeon (KR); Hee-Young Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 664 days.

(21) Appl. No.: 14/874,215

(22) Filed: Oct. 2, 2015

(65) Prior Publication Data
US 2016/0098487 A1    Apr. 7, 2016

(30) Foreign Application Priority Data
Oct. 7, 2014 (KR) .................. 10-2014-0135214

(51) Int. Cl.
G06F 17/30 (2006.01)
H04J 13/00 (2011.01)

(52) U.S. Cl.
CPC .. *G06F 17/30867* (2013.01); *G06F 17/30424* (2013.01); *H04J 13/0048* (2013.01)

(58) Field of Classification Search
None
See application file for complete search history.

(56) References Cited

U.S. PATENT DOCUMENTS

| | | | |
|---|---|---|---|
| 2014/0173034 A1* | 6/2014 | Liu | H04L 67/1063 709/217 |
| 2015/0172900 A1* | 6/2015 | Pianese | H04L 41/12 370/254 |
| 2015/0234663 A1* | 8/2015 | Chishti | G06F 9/3808 712/207 |

OTHER PUBLICATIONS

Li Fan et al, "Summary Cache: A Scalable Wide-Area Web Cache Sharing Protocol", IEEE/ACM Tran Sactions on Networking, vol. 8, No. 3, pp. 281-293, Jan. 2000.

* cited by examiner

*Primary Examiner* — Anhtai V Tran
(74) *Attorney, Agent, or Firm* — LRK Patent Law Firm

(57) ABSTRACT

A system for searching in accordance with an embodiment of the present invention includes: one or more sub nodes configured to generate one or more sub bloom filters corresponding to one or more object identification information; and a representative node configured to generate a representative bloom filter by applying an orthogonal code to each of said sub bloom filters and aggregating the sub bloom filters having the orthogonal code applied thereto, wherein, when the representative node receives a search request, the representative node is configured to apply the orthogonal code to the representative bloom filter and to determine whether object identification information included in the search request is included in sets corresponding to the sub bloom filters by referring to the representative bloom filter having the orthogonal code applied thereto.

10 Claims, 4 Drawing Sheets

SYSTEM AND METHOD FOR SEARCHING USING ORTHOGONAL CODES

CROSS-REFERENCE TO RELATED APPLICATIONS

This application claims the benefit of Korean Patent Application No. 10-2014-0135214, filed with the Korean Intellectual Property Office on Oct. 7, 2014, the disclosure of which is incorporated herein by reference in its entirety.

BACKGROUND

1. Technical Field

The present invention relates to searching for an object in a particular set to determine whether the object belongs to the particular set, more specifically to searching for an object in a particular set to determine whether the object belongs to the particular set through a bloom filter using orthogonal codes.

2. Background Art

A bloom filter is a data structure indicating that a specific object is present in a particular set by inputting an identifier or details of objects in a hash function, compressing the identifier or details of objects to a predetermined size and storing the identifier or details of objects in a sequence expressed with 1 and 0. That is, in order to check whether the object is present within the bloom filter, it is determined whether an output value resulted from inputting the identifier or details of the object in the hash function is stored with 1 in the bloom filter. The bloom filter is utilized for spelling check, dictionary search, web search, etc. Especially, in the case of an LISP (Locator Identifier Separation Protocol) system, the bloom filter has stored therein information of a set of identifiers of objects that are serviced by a specific router (i.e., Egress Tunnel Router).

SUMMARY

The present invention provides a system for multiplexing a plurality of bloom filters by using orthogonal codes and searching for an object in a particular set through the multiplexed bloom filters.

An aspect of the present invention provides a system for searching that includes: one or more sub nodes configured to generate one or more sub bloom filters corresponding to one or more object identification information; and a representative node configured to generate a representative bloom filter by applying an orthogonal code to each of said sub bloom filters and aggregating the sub bloom filters having the orthogonal code applied thereto. When the representative node receives a search request, the representative node is configured to apply the orthogonal code to the representative bloom filter and to determine whether object identification information included in the search request is included in sets corresponding to the sub bloom filters by referring to the representative bloom filter having the orthogonal code applied thereto.

The orthogonal code may be a Walsh code having a same length as the sub bloom filters, and the representative node may be configured to generate the representative bloom filter by multiplying the orthogonal code to each of the sub bloom filters and aggregating the sub bloom filters having the orthogonal code multiplied thereto.

The representative node may be configured to generate the representative bloom filter by applying FFT (Fast Fourier Transformation) or DFT (Discrete Fourier Transformation) according to frequencies of signals that are orthogonal to each other.

The one or more sub nodes may be configured to designate sections of the object identification information on the sub bloom filters according to a predetermined criterion and write a bit in a section corresponding to each of the object identification information according to a hash value of each of the object identification information.

The one or more sub nodes may be configured to designate the sections of the object identification information on the sub bloom filters according to a value resulted from a and operation for the object identification information.

The one or more sub nodes may be configured to designate the sections of the object identification information on the sub bloom filters according to the type of the object identification information.

The one or more sub nodes may be configured to designate the sections of the object identification information according to whether the pertinent object identification information is an W address, an IMSI based on a 3GPP standard or a flat structure.

Another aspect of the present invention provides a method for searching for object identification information by a system for searching that includes: generating one or more sub bloom filters corresponding to one or more object identification information; generating a representative bloom filter by applying an orthogonal code to each of the sub bloom filters and aggregating the sub bloom filters having the orthogonal code applied thereto; applying the orthogonal code to the representative bloom filter, when a search request is received; determining whether object identification information included in the search request is included in sets corresponding to the sub bloom filters by referring to the representative bloom filter having the orthogonal code applied thereto.

The orthogonal code may be a Walsh code having a same length as the sub bloom filters, and the generating of the representative bloom filter by applying an orthogonal code to each of the sub bloom filters and aggregating the sub bloom filters having the orthogonal code applied thereto may include generating the representative bloom filter by multiplying the orthogonal code to each of the sub bloom filters and aggregating the sub bloom filters having the orthogonal code multiplied thereto.

The generating of the representative bloom filter by applying an orthogonal code to each of the sub bloom filters and aggregating the sub bloom filters having the orthogonal code applied thereto may include generating the representative bloom filter by applying FFT (Fast Fourier Transformation) or DFT (Discrete Fourier Transformation) according to frequencies of signals that are orthogonal to each other.

The generating of one or more sub bloom filters corresponding to one or more object identification information may include: designating sections of the object identification information on the sub bloom filters according to a predetermined criterion; and writing a bit in a section corresponding to each of the object identification information according to a hash value of each of the object identification information.

The designating of sections of the object identification information on the sub bloom filters according to a predetermined criterion may include designating the sections of the object identification information on the sub bloom filters according to a value resulted from a mod operation for the object identification information.

The designating of sections of the object identification information on the sub bloom filters according to a predetermined criterion may include designating the sections of the object identification information on the sub bloom filters according to the type of the object identification information.

The designating of sections of the object identification information on the sub bloom filters according to a predetermined criterion may include designating the sections of the object identification information according to whether the pertinent object identification information is an IP address, an IMSI based on a 3GPP standard or a flat structure.

According to the present invention described above, a plurality of bloom filters may be multiplexed using orthogonal codes, and it can be determined whether an object belongs to a particular set through the multiplexed bloom filters, thereby lowering the possible occurrence of a false positive error.

Moreover, according to the present invention, it is possible to delete a particular object identification information from a set of a bloom filter.

DETAILED DESCRIPTION

Since there can be a variety of permutations and embodiments, of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

Figure 1:
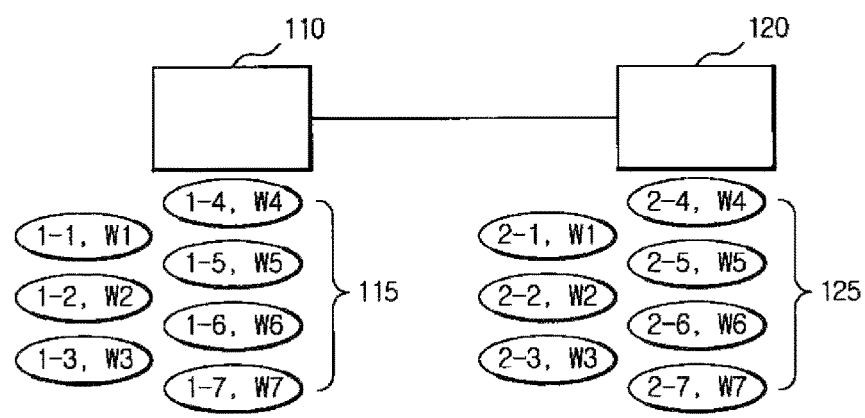
FIG. 1 shows a system for searching in accordance with an embodiment of the present invention.
Figure 2:
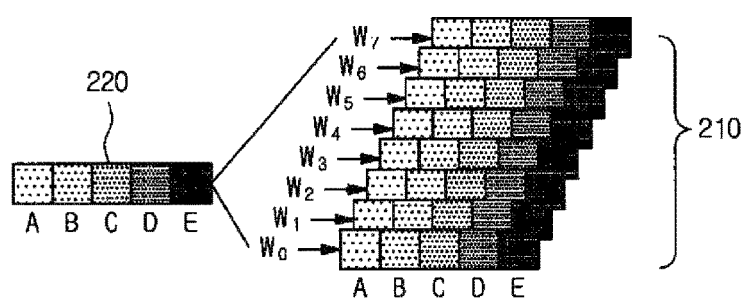
FIG. 2 illustrates sub-bloom filters and a representative bloom filter of the system for searching in accordance with an embodiment of the present invention.

FIG. 1 shows a system for searching in accordance with an embodiment of the present invention, and FIG. 2 illustrates sub-bloom fitters and a representative bloom filter of the system for searching in accordance with an embodiment of the present invention.

Referring to FIG. 1, the system for searching in accordance with an embodiment of the present invention includes representative nodes 110, 120 and one or more sub nodes 115, 125.

Each of the sub nodes 115, 125 generates a bloom filter for at least one of object identification information. Here, the object identification information may be information that can distinguish a particular object, such as a person, an article, a word, etc., from another object. Moreover, the bloom filter may be constituted with a plurality of sections, of which sections may be designated for the object identification information to be reflected thereto according to predetermined classification criteria. The value for a designated section of the bloom filter may be determined based on a hashed result (i.e., hash value) for the object identification information. The processes for reflecting at least one of object identification information to a single bloom filter are well known to those who are ordinarily skilled in the art to which the present invention pertains and thus will not be described herein. Moreover, each of the sub nodes 115, 125 may be configured to use a hash function that allows hash values of the object identification information not to be duplicated. That is, each of the sub nodes 115, 125 may use a hash function that outputs hash values for first object identification information and hash values for second object identification information in such a way that the hash values for the first object identification information and the hash values for the second object identification information are not identical with one another.

Referring to FIG. 2, for example, the predetermined classification criterion may be a result from a mod operation for the object identification information. If the bloom filter is divided into A, B, C, D and E sections, the classification criterion may divide the object identification information into 5 (that is, apply object identification information %5) and designate the section for the pertinent object identification information as section A if the result of the mod operation is 0, section B if the result of the mod operation is 1, section C if the result of the mod operation is 2, section D if the result of the mod operation is 3, and section E if the result of the mod operation is 4.

In another example, the sections for the object identification information may be designated based on the type of object identification information. That is, as the object identification information should be one of IP address, IMSI according to the 3GPP standard and a flat structure, the sections of the bloom filter may be designated for the pertinent object identification information. For example, in the case where the object identification information is an IP address, the section A may be designated as the section for the object identification information. Moreover, if the object identification information is IMSI according to the 3GPP standard, the sections B and C may be designated as the sections for the object identification information, and if the object identification information is a flat structure, the sections D and E may be designated as the sections for the object identification information.

The representative nodes 110, 120 are connected with one or more sub nodes 115, 125 to receive bloom filters from the sub nodes 115, 125. Each of the representative nodes 110, 120 generates a multiplexed bloom filter (referred to as "representative bloom filter" hereinafter) by multiplying a predesignated orthogonal code to each bloom filter and combining the orthogonal code multiplied bloom filters. Referring to FIG. 2, for example, the representative nodes 110, 120 may generate a representative bloom filter 220 by multiplying orthogonal codes $W_0$~$W_7$ to the sub bloom filters 210, respectively, and combining the orthogonal code multiplied sub bloom filters 210 with one another.

Here, in case the orthogonal code, for example, the Walsh code, has the length of L, the sum of XOR of different codes is ½*L, and the sum of same codes is 0, and the number of 0s is the same as that of 1s for each code.

Moreover, as shown in Equation 1 and Equation 2 below, the orthogonal code may be frequencies that are orthogonal to each other according to FFT (Fast Fourier Transformation) or DFT (Discrete Fourier Transformation).

$$f_j = \sum_{k=0}^{n-1} x_k e^{-\frac{2\pi i}{n} jk}$$ [Equation 1]
$$j = 0, 1, \ldots, n-1$$

$$f_j = \sum_{k=0}^{n-1} x_k W^{jk}$$ [Equation 2]
$$j = 0, 1, \ldots, n-1$$

Here, $x_k$ is a component (bit) of the k-th sub bloom filter, and "n" is the number of sub bloom filters, and "$f_j$" is a frequency corresponding to the j-th sub bloom filter. Therefore, the representative nodes 110, 120 may apply the FFT or DFT according to the frequencies based on Equation 1 and Equation 2 and generate the representative bloom filter by combining signals having the FFT or DFT applied thereto.

Accordingly, the representative nodes 110, 120 may each generate the representative bloom filter by use of an orthogonal codes having the same length as each sub bloom filter. The representative nodes 110, 120 send their respective representative bloom filters to each other. For example, the representative node 110 may send its generated representative bloom filter to the representative node 120, and the representative node 120 may send its generated representative bloom filter to the representative node 110.

Moreover, the representative nodes 110, 120 receive a search request, which includes object identification information, from an external device such as a terminal. Upon receiving the search request, the representative node 110, 120 determine whether the object identification information included in the search request is included in one or more sets corresponding to the representative bloom filters. That is, the representative nodes 110, 120 designate the sections corresponding to the object identification information according to the predetermined criteria described above.

The representative nodes 110, 120 extract bloom filters corresponding to the sub nodes 115, 125, respectively, by successively multiplying the orthogonal codes to the representative bloom filters. By checking for bits corresponding to a value resulted from hashing the object identification information (i.e., computing by inputting the object identification information in a predetermined hash function) among the bits corresponding to the designated sections of the bloom filters corresponding to the sub nodes 115, 125, the representative nodes 110, 120 determine whether the object identification information belongs to a set corresponding to the bloom filters of the sub nodes 115, 125. The representative nodes 110, 120 send a determined result to the external device.

Figure 3:
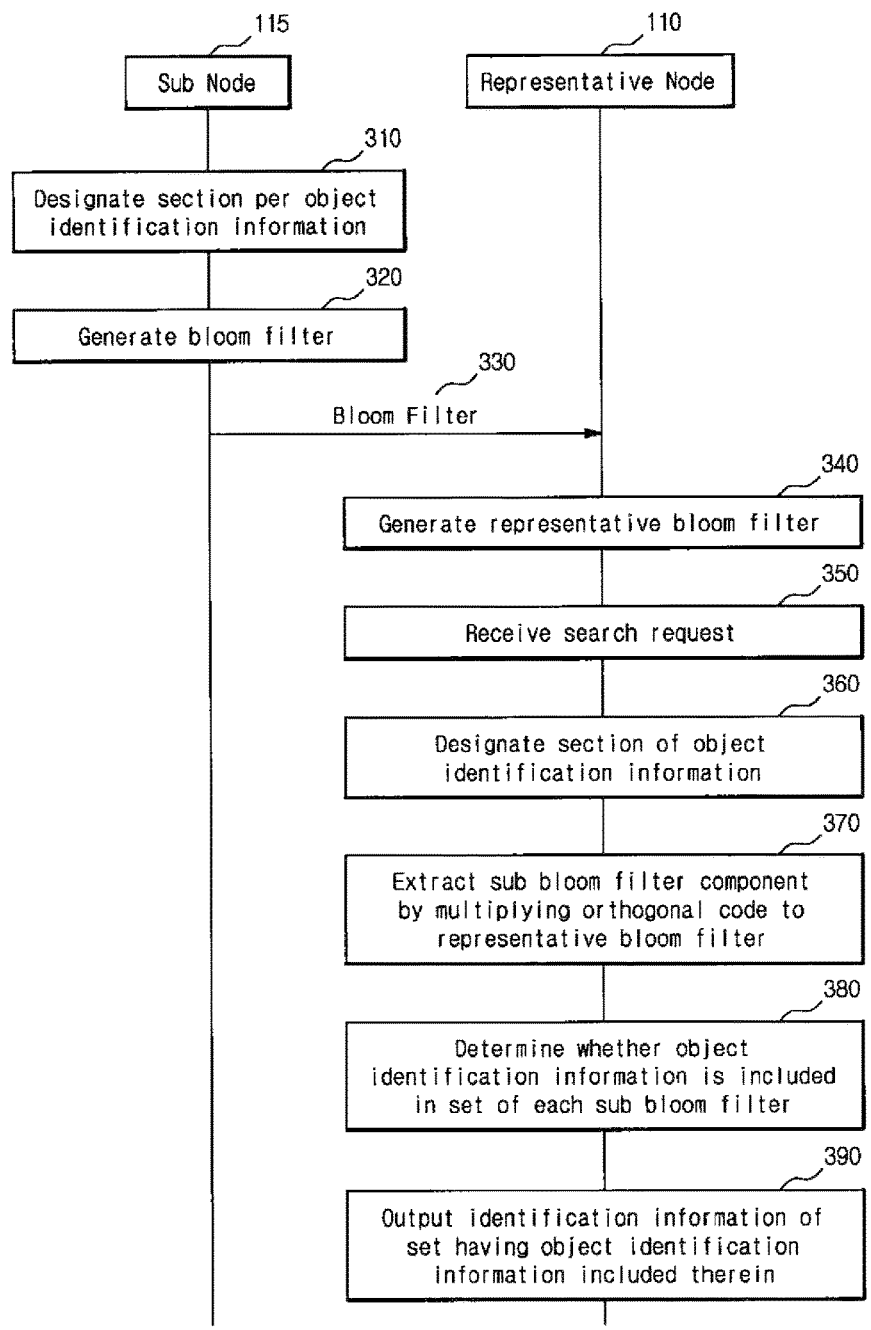
FIG. 3 is a flow diagram showing how the system for searching in accordance with an embodiment of the present invention performs searching for object identification information.

FIG. 3 is a flow diagram showing how the system for searching in accordance with an embodiment of the present invention performs searching for object identification information. Although FIG. 3 is illustrated for a case of two sub nodes, it is possible that the system for searching in accordance with an embodiment of the present invention includes 3 or more sub nodes.

Referring to FIG. 3, in step 310, each of the sub nodes 115, 125 designates a section corresponding to each object identification information according to predetermined classification criteria.

In step 320, each of the sub nodes 115, 125 writes in a bloom filter a bit value corresponding to a value resulted from hashing each object identification information among bits corresponding to the designated section of the bloom filter.

In step 330, each of the sub nodes 115, 125 sends the bloom filter to the representative node 110, 120.

In step 340, the representative node 110, 120 generates a representative bloom filter by multiplying an orthogonal code corresponding to the pertinent bloom filter to the bloom filter received from the sub node 115, 125 and then combining orthogonal code multiplied bloom filters with one another.

In step 350, the representative node 110, 120 receives a search request including the object identification information from an external device.

In step 360, the representative node 110, 120 designates a section of the object identification information included in the search request. Here, the processes for designating the section of the object identification information have been described above with reference to FIG. 2.

In step 370, the representative node 110, 120 extracts a bloom filter of each sub node 115, 125 by multiplying each orthogonal code to the representative bloom filter.

In step 380, the representative node 110, 120 determines whether there is, a set having the object identification information included therein, by referring to each bloom filter extracted in step 370. That is, the representative node 110, 120 determines whether the object identification information is included in the set of the pertinent bloom filter by checking for bits of the bloom filter corresponding to a value resulted from hashing the object identification information.

In step 390, the representative node 110, 120 sends identification information of a set having the pertinent object identification information included therein among the sets of each bloom filter to the external device.

Figure 4:
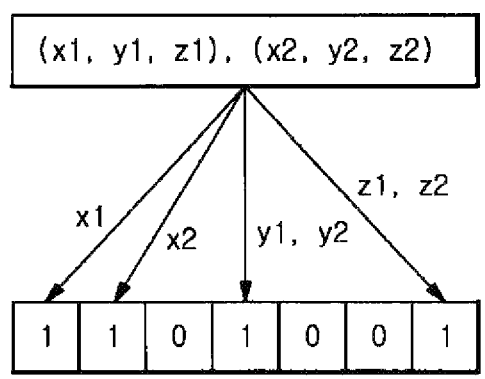
FIG. 4 is a conceptual diagram showing how a plurality of object identification information is written when a single bloom filter is used.
Figure 5:
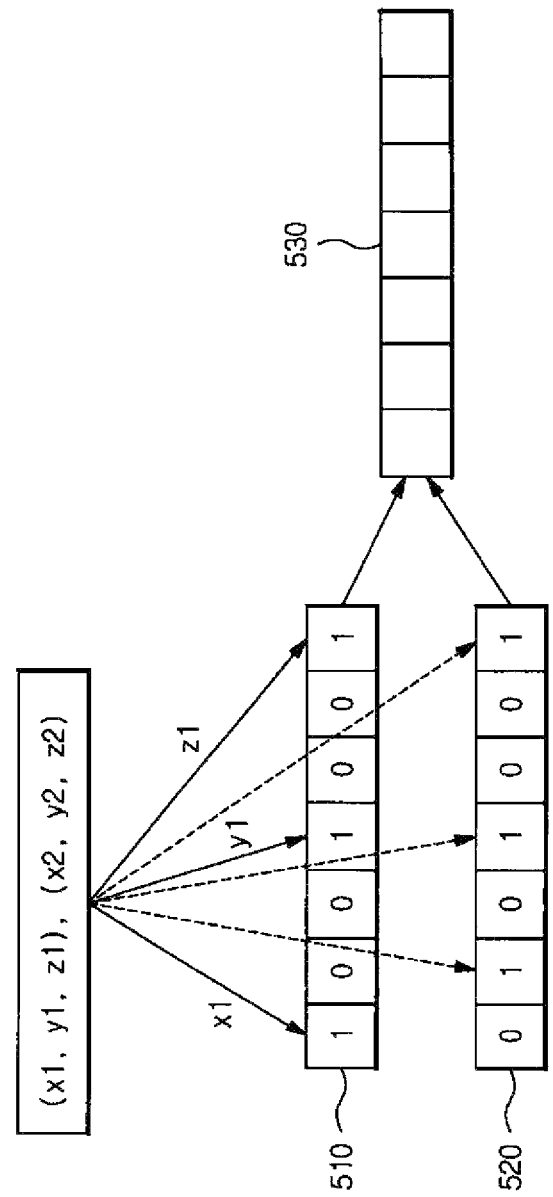
FIG. 5 is a conceptual diagram showing how a plurality of object identification information is written when a bloom filter in accordance with an embodiment of the present invention is used.

FIG. 4 is a conceptual diagram showing how a plurality of object identification information is written when a single bloom filter is used, and FIG. 5 is a conceptual diagram showing how a plurality of object identification information is written when a bloom filter in accordance with an embodiment of the present invention is used. Here, it is assumed in FIG. 4 and FIG. 5 that the illustrated bloom filters are configured to output 3 hash values for a single object identification information through 3 hash functions.

When a bloom filter is used, a false positive error, which determines that an object belongs to a set although no object belongs to the set, may be occurred. Particularly, there are greater chances of having the false positive error occurred if an increased number of objects are written in a fixed length of bloom filter or if the length of the bloom filter is, shorter (i.e., the range of hashing results is narrower).

Referring to FIG. 4, when a single bloom filter is used, hash values (x1, y1, z1) of first object identification information and hash values (x2, y2, z2) of second object identification information are written in their respective bits of the single bloom filter. Here, in case x1 and x2 are different from each other, y1 and y2 identical with each other, and z1 and z2 identical with each other, x1 and x2 are written in different bits from each other, and y1 and y2 are written as "1" in a same bit. Moreover, z1 and z2 are also written as "1" in a same bit. Accordingly, since there are cases where a same bit is used to write the hash values of different object identification information, it is possible to have the false positive error occurred, by determining that particular object identification information is included in the set due to the bits written with "1" by different object identification information even though the particular object identification information is not included in the set.

Referring to FIG. 5, the system, for searching in accordance with an embodiment of the present invention may write the hash values (x1, y1, z1) of the first object identification information and the hash values (x2, y2, z2) of the second object identification information in their respective bits of different sub bloom filters 510, 520. Specifically, the hash values (x1, y1, z1) of the first object identification information and the hash values (x2, y2, z2) of the second object identification information may be each written as "1" in different bits. Accordingly, the system for searching in accordance with an embodiment of the present invention has less chances of having a false positive error occurred than the case shown in FIG. 4. Moreover, the system for searching in accordance with an embodiment of the present invention generates a same length of representative bloom filter 530 as a single bloom filter by multiplying orthogonal codes to a plurality of sub bloom filters, respectively, and aggregating the sub bloom filters. Therefore, the system for searching in accordance with an embodiment of the present invention may lower the chances of having a false positive error occurred even if the length of the bloom filter required for searching is not extended.

Referring back to FIG. 4, since the hash values of the plurality of object identification information may be possibly written in a same bit of the bloom filter, it is not possible to delete a particular object identification information from a set unless a counter value is explicitly stored in the bit to indicate how many hash values of the object identification information are written therein. Moreover, an additional storage space is required in order to store the counter value for each bloom filter.

However, with the system for searching in accordance with an embodiment of the present invention, it is possible to delete a particular object identification information from a set, without an additional storage space. That is, since the system for searching in accordance with an embodiment of the present invention uses a plurality of sub bloom filters, a single bit of a single sub bloom filter may be set as "1" by the hash value of a single object identification information. Accordingly, even if particular object identification information is deleted from a set, the bit of a sub bloom filter based on a hash value of another object identification information is not affected.

Hitherto, a certain embodiment of the present invention has been described, and it shall be appreciated that a large number of permutations and modifications of the present invention are possible without departing from the intrinsic features of the present invention by those who are ordinarily skilled in the art to which the present invention pertains. Accordingly, the disclosed embodiment of the present invention shall be appreciated in illustrative perspectives, rather than in restrictive perspectives, and the scope of the technical ideas of the present invention shall not be restricted by the disclosed embodiments. The scope of protection of the present invention shall be interpreted through the claims appended below, and any and all equivalent technical ideas shall be interpreted to be included in the claims of the present invention.

What is claimed is:

1. A representative node comprising:
a processor; and
a memory storing at least one instruction executed by the processor,
wherein the at least one instruction is configured to:
receive, from one or more sub nodes, one or more sub bloom filters corresponding to one or more object identification information;
generate a representative bloom filter by applying an orthogonal code to each of the sub bloom filters and aggregating the sub bloom filters having the orthogonal code applied thereto;
receive, from an external device, a search request including object identification information;
apply the orthogonal code to the representative bloom filter;
determine whether the object identification information is included in sets corresponding to the sub bloom filters by referring to the representative bloom filter having the orthogonal code applied thereto; and
transmit a result of the determination to the external device,
wherein sections of the object identification information on the sub bloom filters are designated according to a type of the object identification information, and bit is written in a section corresponding to each of the object identification information according to a hash value of each of the object identification information.

2. The system of claim 1, wherein:
the orthogonal code is a Walsh code having a same length as the sub bloom filters, and
the representative bloom filter is generated by multiplying the orthogonal code to each of the sub bloom filters and aggregating the sub bloom filters having the orthogonal code multiplied thereto.

3. The system of claim 1, wherein the representative bloom filter is generated by applying FFT (Fast Fourier Transformation) or DFT (Discrete Fourier Transformation) according to frequencies of signals that are orthogonal to each other.

4. The system of claim 1, wherein the sections of the object identification information on the sub bloom filters are designated according to a value resulted from a mod operation for the object identification information and the type of the object identification information.

5. The system of claim 1, wherein the sections of the object identification information are designated according to whether the pertinent object identification information is an IP address, an IMSI based on a 3GPP standard or a flat structure.

6. An operating method of a representative node including a processor, the method comprising:
receiving, by the processor, one or more sub bloom filters corresponding to one or more object identification information from one or more sub nodes;
generating, by the processor, a representative bloom filter by applying an orthogonal, code to each of the sub bloom filters and aggregating the sub bloom filters having the orthogonal code applied thereto;
receiving, by the processor, a search request including object identification information from an external device;
applying, by the processor, the orthogonal code to the representative bloom filter;
determining, by the processor, whether object identification information is included in sets corresponding to the sub bloom filters by referring to the representative bloom filter having the orthogonal code applied thereto; and
transmitting, by the processor, a result of the determination to the external device, wherein sections of the object identification information on the sub bloom filters are designated according to a type of the object identification information, and bit is written in a section corresponding to each of the object identification information according to a hash value of each of the object identification information.

7. The method of claim 6, wherein:

the orthogonal code is a Walsh code having a same length as the sub bloom filters, and the representative bloom filter is generated by multiplying the orthogonal code to each of the sub bloom filters and aggregating the sub bloom filters having the orthogonal code multiplied thereto.

8. The system of claim 6, wherein the representative bloom filter is generated by applying FFT (Fast Fourier Transformation) or DFT (Discrete Fourier Transformation) according to frequencies of signals that are orthogonal to each other.

9. The method of claim 6, wherein the sections of the object identification information on the sub bloom filters are designated according to a value resulted from a mod operation for the object identification information and the type of the object identification information.

10. The method of claim 6, wherein the sections of the object identification information are designated according to whether the pertinent object identification information is an IP address, an IMSI based on a 3GPP standard or a flat structure.

* * * * *